United States Patent [19]

Ivers et al.

[11] Patent Number: 4,887,699

[45] Date of Patent: Dec. 19, 1989

[54] VIBRATION ATTENUATING METHOD UTILIZING CONTINUOUSLY VARIABLE SEMIACTIVE DAMPER

[75] Inventors: Douglas E. Ivers, Cary; Lane R. Miller, Fuquay-Varina; Warren R. Schroeder, Cary, all of N.C.

[73] Assignee: Lord Corporation, Erie, Pa.

[21] Appl. No.: 310,109

[22] Filed: Feb. 10, 1989

[51] Int. Cl.⁴ .............................................. F16F 9/18
[52] U.S. Cl. .................................... 188/378; 188/280; 188/312; 188/313; 188/322.13; 188/299; 267/136; 267/221; 248/550; 280/707; 280/714
[58] Field of Search ............... 188/299, 378, 380, 312, 188/311, 316, 280, 322.13, 322.2, 279, 313; 280/707, 714; 267/64.11–64.28, 217, 218, 221, 136; 364/424.05; 248/550, 636, 562

[56] References Cited

U.S. PATENT DOCUMENTS

| | | | |
|---|---|---|---|
| 2,235,488 | 3/1941 | Mercier | 188/88 |
| 3,321,210 | 5/1967 | Delchev | 280/6 |
| 3,420,341 | 1/1969 | Keehn, II | 188/88 |
| 3,807,678 | 4/1974 | Karnopp et al. | 188/299 X |
| 3,826,343 | 7/1974 | Heymann | 188/282 |
| 3,995,883 | 12/1976 | Glaze | 280/707 |
| 4,034,860 | 7/1977 | Leppich | 188/282 |
| 4,468,050 | 8/1984 | Woods et al. | 280/707 |
| 4,468,739 | 8/1984 | Woods et al. | 280/707 X |
| 4,491,207 | 1/1985 | Boonchanta et al. | 188/299 |
| 4,530,425 | 7/1985 | Veaux et al. | 188/299 |
| 4,620,619 | 11/1986 | Emura et al. | 188/319 |
| 4,635,765 | 1/1987 | Schmidt | 188/299 |
| 4,660,686 | 4/1987 | Münning et al. | 188/280 |
| 4,696,489 | 9/1987 | Fujishiro et al. | 280/707 |
| 4,742,998 | 5/1988 | Schubert | 188/322.5 X |
| 4,743,000 | 5/1988 | Karnopp | 267/64.21 X |
| 4,756,549 | 7/1988 | Kurosawa et al. | 280/707 |
| 4,786,034 | 11/1988 | Heess et al. | 267/64.11 X |

FOREIGN PATENT DOCUMENTS

1336186 7/1963 France.
1188453 4/1970 France.
2164120 3/1986 United Kingdom.

OTHER PUBLICATIONS

Crosby et al., Vibration Control Using Semi-Active Force Generators, Transaction of the ASME Paper No. 73-DET-122.
Margolis et al., Heave Mode Dynamics of a Tracked Air Cushion Vehicle with Semiactive Airbag Secondary Suspension, Journal of Dynamic Systems Measurement and Control, Dec. 1975, pp. 399–407.
Margolis, Semi-Active Control of Wheel Hop in Ground Vehicles, Vehicle System Dynamics, 1983, pp. 317–330.
Krasnicki, The Experimental Performance of an "On-Off" Active Damper, Lord Corporation Technical Article, Circa 1981.
Hrovat et al., An Experimental Comparison Between Semiactive and Passive Suspensions for Air-Cushion Vehicles, Int. J. of Vehicle Design, 1981.
Lord Corporation Semi-Active Suspensions, Lord Corporation Technical Article.
Margolis, The Chatter of Semi-Active On-Off Suspensions and its Cure, Vehicle System Dynamics, vol. 13, 1984.

Primary Examiner—Douglas C. Butler
Attorney, Agent, or Firm—Bell, Seltzer, Park & Gibson

[57] ABSTRACT

Operation of a continuously variable semiactive damper of the system is modified so as to reduce generation in the system of undesirable shocks and noise. The modifications include delaying some or all of the changes in the on/off states of the damper, and/or limiting the rate and/or extent of changes in the damping coefficient of the damper at certain of the times when the damper is in an on state.

18 Claims, 4 Drawing Sheets

VIBRATION ATTENUATING METHOD UTILIZING CONTINUOUSLY VARIABLE SEMIACTIVE DAMPER

FIELD OF THE INVENTION

This invention relates to systems for attenuating transmission of vibratory and similar forces between relatively movable members interconnected by semiactive damper means of the "continuously" or "infinitely" variable type. The invention more specifically relates to methods for reducing undesirable shock forces which may at times be generated during operation of a system containing semiactive damper means of the foregoing type.

BACKGROUND OF THE INVENTION

Semiactive dampers, and in some instances control policies for them, are disclosed in U.S. Pat. Nos. 3,807,678, 3,995,883, 4,468,050, 4,468,739, 4,491,207, 4,696,489, and 4,742,998; as well as in U.S. Pat. application Ser. Nos. 06/913,067, filed 29 September 1986, and 06/945,380, filed 22 December 1986, both of which are owned by the assignee of the present application, and in an article by M. J. Crosby et al, entitled "VIBRATION CONTROL USING SEMIACTIVE FORCE GENERATORS."

Semiactive dampers may be of the "off/on" type or of the "continuously" or "infinitely" variable type. A damper of the first type is switched, in accordance with the dictates of a suitable control policy, between alternative "on" and "off" damping states or conditions. In its on state, the damping coefficient of the damper is of preselected relatively high magnitude. The term "damping coefficient," as used herein, means the relationship of the damping force generated by the damper to the relative velocity across the damper, which relationship is not necessarily linear. In its off state, the damping coefficient of the damper is of relatively low magnitude. This may be approximately zero, but in many vehicle suspensions should be of a magnitude sufficiently greater than zero as to discourage "wheel hop." A continuously variable semiactive damper is also switched during operation between an off state, wherein its damping coefficient is approximately zero or of other low magnitude, and an on state. However, when a continuously variable damper is in its on state the damping coefficient thereof may be and normally is changed between a large (theoretically infinite) number of different magnitudes. If operated pursuant to a suitable control policy, a continuously variable semiactive damper may be caused to perform, when in its on state, in a manner similar to the hypothetical "sky-hook" damper discussed in the hereinbefore-mentioned Crosby et al article and in U.S. Pat. No. 4,742,998.

A known control policy for a continuously variable semiactive damper dictates that damper be "on," and that the significant damping forces generated by it be proportional (although not necessarily linearly) to the absolute velocity of the supported member, when the sign of the product of such absolute velocity times the relative velocity between the supported member and the supporting member is positive, i.e., is greater than zero. The policy dictates that the damper be in its off state, wherein the damping coefficient is of preselected low magnitude, when the sign of the aforesaid product is negative, i.e., when the product is less than zero. Generally comparable results may be achieved, particularly at relatively high frequency excitations, by use of an alternative control policy which dictates that damping forces proportional to the relative displacement between the supported and supporting members be produced by the continuously variable semiactive damper at those times when the product of the relative velocity times the relative displacement between the members is less than zero, i.e., when the sign of the product is negative or minus; and that the damping forces be of low magnitude when the aforesaid product is greater than zero, i.e., when its sign is positive or plus.

Although generally producing good results, vibration attenuating systems having continuously variable semiactive damper means controlled in strict accordance with the control policies of the foregoing or similar types may experience shock forces of significant magnitude at some of the times when the damper is switched between its different damping states or conditions. The aforesaid shocks may stress system components to such an extent as to shorten their useful life, and/or may cause the generation of objectionable noise. The problem of noise generation may be particularly apparent in automobile suspensions or other systems containing a resilient deformable member, such as an automobile tire, that is capable of storing energy upon deformation, and of abruptly releasing its stored energy when allowed to rapidly return toward an undeformed condition.

SUMMARY OF THE INVENTION

The present invention provides an improved control method which reduces the generation of undesirable shock forces and/or noise tending to occur in some vehicle suspension systems, or in other mounting systems, having at least one semiactive damper of the continuously variable type.

In one embodiment of the invention, wherein the continuously variable semiactive damper is controlled in accordance with a modified version of the previously noted control policy predicated upon the sign of the product of the absolute velocity of the supported member times the relative velocity of the supported and supporting members, some or all of the damper state changes dictated by the standard version of such policy are delayed until the absolute velocity of the supported member is no greater than approximately zero or some other preselected relatively low magnitude.

In another embodiment of the invention, wherein the semiactive damper is controlled in accordance with a modified version of the control policy predicated upon the sign of the product of the relative displacement times the relative velocity of the supported and supporting members, at least some of the damper state changes dictated by the standard version of such policy are delayed until the relative displacement between the supported and supporting members is approximately zero or of other preselected relatively low magnitude.

In still another embodiment, wherein the semiactive damper is controlled in accordance with either of the foregoing control policies or some other one, limitation is imposed upon the rate and/or extent of the change that can occur in the damping coefficient and force of the damper. This may be done by limiting the rate and/or extent of movement of a control valve element of the semiactive damper. Alternatively, the degree to which the fluid flow can be restricted may be limited by the provision of a bypass port or passageway that permits continued significant fluid flow parallel to and about the control valve element.

In still another embodiment, wherein the continuously variable semiactive damper is controlled in accordance with a modified version of either the policy predicated upon the product of the absolute velocity of the supported member times the relative velocity of the supported and supporting members, or the control policy predicated upon the product of the relative displacement and the relative velocity of the members, the damping forces produced when the damper is in its on state are caused to be proportional to the relative velocity between the supported and supporting members when such damping forces are smaller than those that would be produced by implementation of the standard version of the control policy.

In a further embodiment, wherein the system is one containing a tire or other resilient deformable member that during system operation undergoes periodic deformation and relaxation, with ensuing respective storage and release of energy, switching of the continuously variable semiactive damper from one to another of its operating conditions or states is delayed until such time as the energy stored by the deformable member is no greater than some preselected low magnitude. In a modification of this embodiment, switching of the damper state is delayed until the foregoing event, or until a preselected motion occurring in the system has some preselected low magnitude, whichever occurs first.

DESCRIPTION OF THE DRAWINGS

Other features of the invention will be apparent from the following description of illustrative embodiments thereof, which should be read in conjunction with the accompanying drawings, in which.

DESCRIPTION OF THE PREFERRED EMBODIMENT

Figure 1:
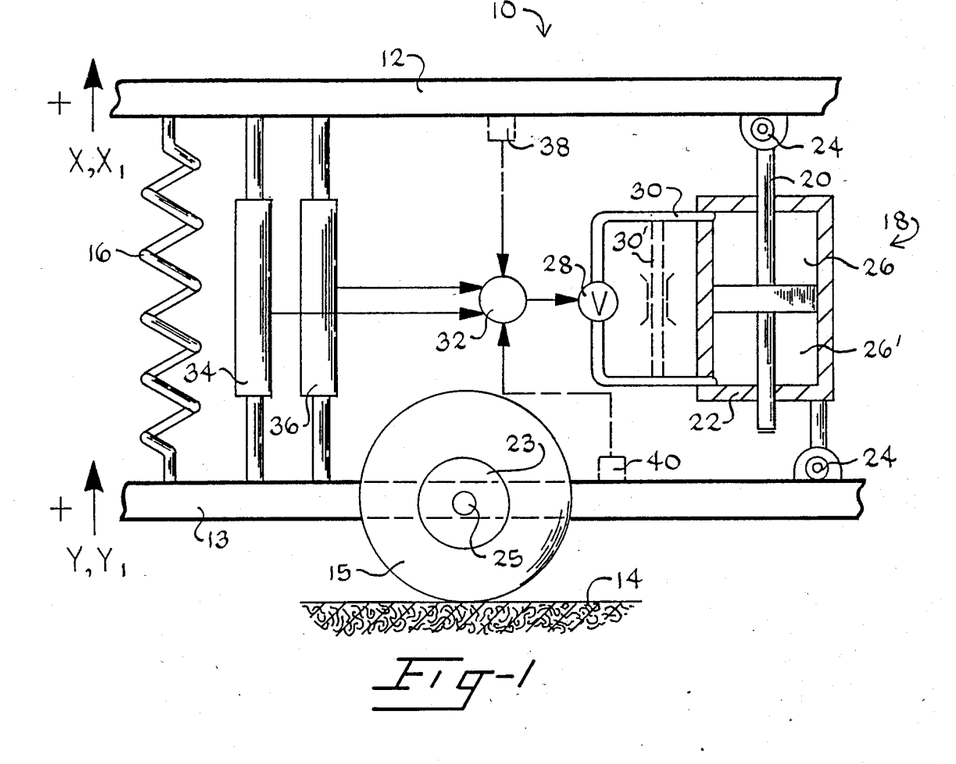
FIG. 1 is a schematic view of a force attenuating suspension or similar mounting system having continuously variable semiactive damper means controllable in accordance with and suitable for practice of the invention.

The numeral 10 in FIG. 1 designates a two degree of freedom suspension or similar force-attenuating mounting system interconnecting vertically spaced and relatively movable supported and supporting members 12, 13, respectively. By way of example, members 12, 13 may respectively be body and frame components of an automobile or other motor vehicle that is supported upon a road or similar surface 14 by conventional resiliently deformable tire members 15, only one of which is shown. A primary function of a vehicle suspension system such as system 10 might be to isolate supported member 12 insofar as possible from vibratory and/or other forces transmitted to member 13 by such things as road-surface irregularities, engine disturbances, etc. The designations X, $X_1$ respectively designate the absolute vertical displacement and the absolute velocity of supported member 12, it being arbitrarily indicated that these are positive when in an upward direction and thus are negative when in a downward direction. The same sign convention and the letters Y, $Y_1$ similarly designate the absolute vertical displacement and the absolute velocity of supported member 13. When system 10 is at rest, X, $X_1$, Y and $Y_1$ are all zero.

System 10 includes compression spring means 16 and semiactive damper means 18 which extend in substantially parallel relationship to each other between members 12, 13 and are connected to such members. While only a single spring/damper set is shown, more would normally be provided in the typical vehicle suspension system. Damper assembly 18 is illustratively of the hydraulic piston and cylinder type. The piston rod 20 and cylinder 22 of damper 18 are secured to respective ones of the supported and supporting members 12, 13 by suitable connectors that illustratively include deformable bushing members 24 formed of elastomer or similar resilient compliant material. Relative vertical movement between members 12, 13 causes relative vertical movement between rod 20 and cylinder 22, which in turn displaces hydraulic fluid between variable volume chambers 26, 26' of damper 18 via an electrically or otherwise rapidly adjustable control valve 28 forming part of a hydraulic circuit 30 interconnecting such chambers. Rod 20 of damper 18 preferably and illustratively extends through both of the cylinder chambers 26, 26' such that the amount of fluid displaced between the chambers is the same irrespective of whether the displacement is produced by compression or by extension of the assembly. This eliminates the need for an accumulator or the like (not shown) in association with damper 18.

Damper 18 is of the "continuously variable" type. It is rapidly switchable between an "off" damping state or condition in which the damping coefficient of the damper is of relatively low magnitude (which in some cases is approximately zero), and an "on" state wherein the damping coefficient of the damper may be caused to be of any desired ones of a large (theoretically infinite) number of relatively high magnitudes. Changes in the damping state of damper 18 result from control signals that are imparted to the actuator (not separately shown) of its valve 28 and that cause the valve to throttle or restrict fluid flow through the valve to the extent indicated by the signals. Valve 28 may be of mechanical, electrorheological or any other type capable of rapid operation in the foregoing manner.

The control signals for controlling valve 28 are illustratively electrical ones produced by an electronic controller 32 that operates pursuant to a preselected control policy and input data received from selected ones of a plurality of motion sensors 34, 36, 38 and 40 associated with members 12, 13. Sensors 34, 36 directly detect relative displacements and relative velocities of supported and supporting members 12, 13. Sensors 38, 40 respectively detect accelerations of supported member 12 and supporting member 13, which accelerations can be utilized by such sensors and/or by controller 32 to derive displacement, absolute velocity and/or relative velocity data. Since the data produced by sensors 34, 36 can also be derived from the data produced by acceleration sensors 38, 40, it will be appreciated that not all of the illustrated sensors need be employed or provided in association with system 10. It will also be understood that pressure-sensitive and other types of sensors might be used instead of the illustrated ones.

Controller 32 is preprogrammed so as to operate in accordance with a standard modified version of any preselected one of a plurality of semiactive damper control policies. One known control policy is based upon the sign of the product of the relative velocity $(X_1-Y_1)$ between the supported and supporting members times the absolute velocity $(X_1)$ of the supported member. More specifically, the standard version of the control policy dictates that the damping coefficient of the damper be approximately zero or of other preselected relatively low magnitude when $X_1(X_1-Y_1)<0$, i.e., when the sign of the aforesaid product is negative or minus. At those times when the $X_1(X_1-Y_1)>0$, i.e., when the sign of the product is positive or plus, the standard control policy causes the damper to be "on," and also then so varies the damping coefficient of the damper as to cause its damping forces to be proportional to the absolute velocity of the supported member of the system. In its implementation of this control policy, or a modified version of it, the controller 32 of FIG. 1 may obtain the necessary data with respect to relative velocity from sensor 36 or may derive all of the necessary data from that supplied by sensors 38, 40, or from some other source. Another damper control policy which may be utilized by controller 32, in its standard or modified form, is based upon the sign of the product of the relative velocity $(X_1-Y_1)$ of the supported and supporting members times the relative displacement $(X-Y)$ of such members. The standard version of this policy dictates that the damping coefficient of damper 18 be approximately zero or of other preselected relatively low magnitude when $(X-Y)(X_1-Y_1)>0$, i.e., when the sign of the product is positive. When the sign of the aforesaid product is negative or minus, i.e., when $(X-Y)(X_1-Y_1)<0$, the standard policy causes the damping coefficient of the damper to be such as to cause generation of damping forces proportional to the relative displacement of the supported and supporting members. The relative displacement and relative velocity data needed for implementation of the policy may be obtained directly from sensors 34, 36 or, alternatively, may be derived from the data produced by acceleration sensors 38, 40.

Figure 2:
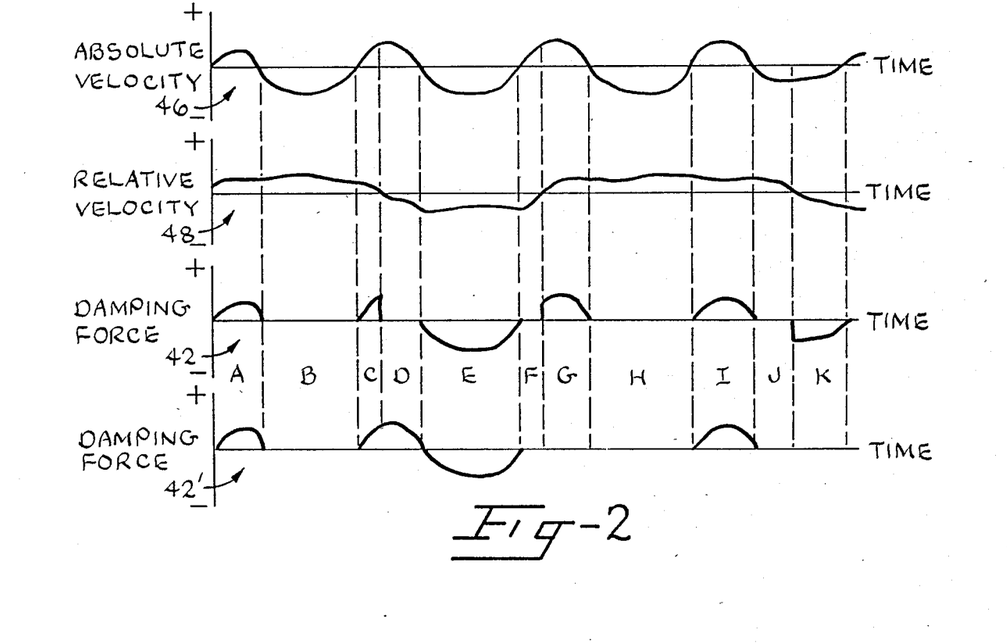
FIG. 2 is a simplified graphic comparison of the damping forces producible by a continuously variable semiactive damper in a system, such as the system of FIG. 1, operated in accordance with a standard version and a modified version of a first control policy.

Utilization of the foregoing control policies in their standard forms may in certain situations result in the production of undesirable system shock forces and/or noise. One such situation is illustrated in FIG. 2 of the drawings which shows in simplified fashion the different damping forces 42, 44 respectively produced in a system, such as the system 10 of FIG. 1, when damper 18 is switched (i.e., caused to undergo changes in its damping state) in accordance with the dictates of standard and modified versions, respectively, of the control policy predicated upon the sign of the product of the absolute velocity 46 of supported member 12 times the relative velocity 48 of members 12, 13. Standard implementation of the aforesaid control policy causes generation of damping forces 42, which are proportional to absolute velocity 46, in those time intervals A, C, E, G, I and K when the product of the absolute velocity 46 and the relative velocity 48 is greater than zero, i.e., is positive or plus. In the other illustrated time intervals, wherein the aforesaid product is less than zero, the damper is in its "off" state and the damping forces are of preselected relatively low magnitude (illustratively zero). It will be noted that abrupt changes or discontinuities in damping forces 42 occur at the end of time interval C and at the commencement of time intervals G and K. These force discontinuities coincide with "zero crossings," i.e., changes in the sign of the relative velocity 48. Immediately prior to the end of time interval C, generation of substantial damping forces 42 by damper 18 was dictated by the standard control policy, and such forces were being produced. In order to produce these damping forces when, as in time interval C, the relative velocity 48 was never large and was becoming increasingly smaller, the control signals directed to damper valve 28 caused it to throttle or restrict the fluid flow to an increasing extent which became maximum as relative velocity 48 reached approximately zero. As relative velocity 48 passed through zero, the standard control policy dictated that the damping forces be zero or of other low magnitude. Valve 28 therefore is caused to undergo abrupt transition from its prior condition, wherein it is substantially completely "closed" and provides maximum resistance to fluid flow, to a condition wherein it is substantially fully "open" and provides minimum resistance to fluid flow. This results in the indicated discontinuity in and abrupt reduction of damping force 42 at the end of time interval C. Similarly, immediately prior to the time intervals G and K, when the absolute velocity 46 and the relative velocity 48 are positive and negative, respectively, the control policy then dictates that no damping forces be produced, as a result of which damper valve 28 then occupies its fully "open" condition wherein it provides minimum resistance to fluid flow. As the relative velocity 48 crosses through zero at the outset of each of the time intervals G and K, the control policy dictates that damper 18 generate damping forces of substantial magnitude, proportional to the magnitude of absolute velocity 46. In order to generate damping forces 42 of such magnitude, at a time when the relative velocity 48 is of small magnitude, valve 28 of the damper undergoes an abrupt transition from its prior substantially fully open condition to its substantially fully closed condition, causing the abrupt force increases and discontinuities at the outset of the time intervals G and K. The indicated force discontinuities may produce undesirable stresses and/or noise in the system.

The lowermost plot of FIG. 2 indicates the changed damping forces 42' that ensue when the previously described standard control policy is modified so as to delay changes in the damping state of damper 18 until absolute velocity 46 is zero or of other preselected relatively small magnitude. Under this modified control policy, the damping forces 42' generated in time intervals A, E and I are the same as the forces 42 in such time periods. However, the forces 42' which began to be generated in time interval C continue to be generated during and throughout time interval D, and no damping forces whatsoever are generated during time intervals G and K. The discontinuities in the damper force 42 arising from use of the standard version of the control policy therefore do not occur in the damping force 42' generated pursuant to the modified version of such control policy.

The modified control policy need not always defer all state changes of damper 18. It may instead be so designed as to defer only a preselected percentage of the state changes, or only those in which the state change is from on to off, or from off to on, etc., in which case not all of the force discontinuities will be eliminated.

Figure 3:
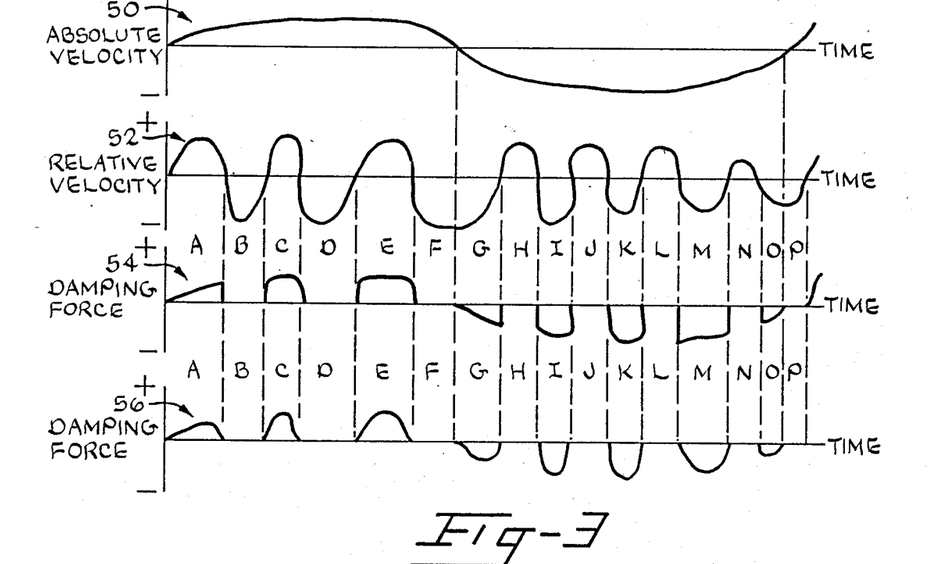
FIG. 3 is a simplified graphic comparison of the damper forces produced by the semiactive damper during standard operation and another modified mode of operation thereof.
Figure 6:
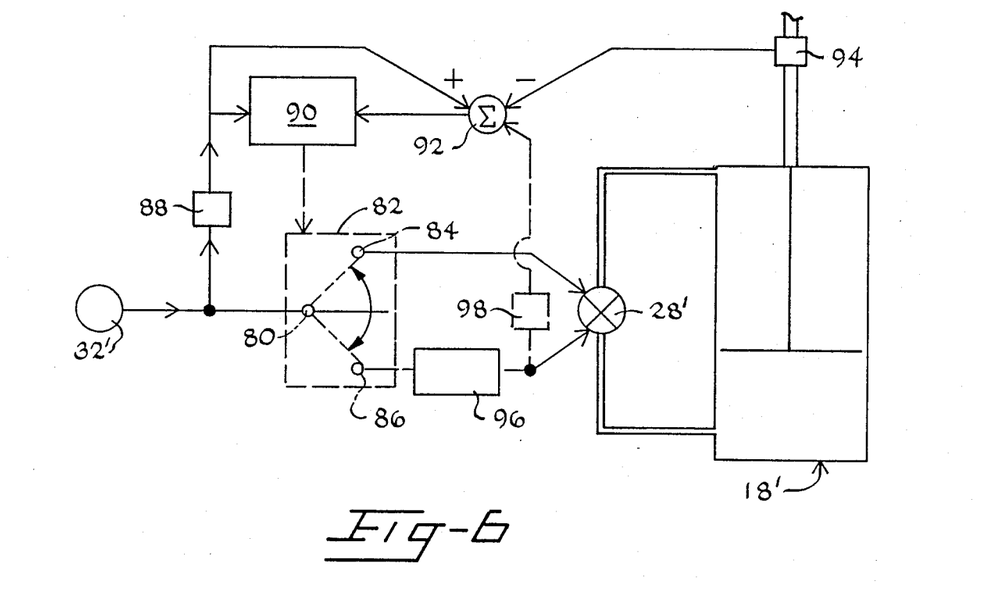
FIG. 6 is a schematic representation of alternative control components for a semiactive damper in accordance with the invention.

The above-discussed modified control policy is most suitable for use in systems where there are many more zero crossings of the absolute velocity 46 than of the relative velocity 48. Substantial deterioration of the vibration attenuating performance of the damper may occur when the system is not of this type. FIG. 3 of the drawings is a simplified graphic representation of a system of the latter type, i.e., one in which there are considerably less zero crossings of the absolute velocity 50 than of the relative velocity 52. Pursuant to the dictates of the standard version of the control policy utilizing the sign of the product of the absolute velocity times the relative velocity, damper 18 is in its off state and no significant damping forces are generated in the time intervals B, D, F, H, J, L, N and P. In time intervals A, C, E, G, I, K, M and O, damper 18 is in its on state and generates damping forces which are proportional to absolute velocity 50. Except at the commencement of time intervals A and G and at the end of time interval O, at each of which there is a zero crossing of absolute velocity 50, the damping force 54 in each of the latter time intervals is characterized by an initial abrupt force increase and a final abrupt force decrease. As is indicated by the force curves 56 in FIG. 3, the abruptness of these transitional force changes can be significantly reduced by limiting to a preselected maximum magnitude the rate at which the adjustably variable damper valve 28 undergoes adjustment, and thus the rate of change of the damping coefficient of damper 18. FIG. 6 is a schematic representation of one type of apparatus that can be employed to achieve the foregoing result. Components of the FIG. 6 apparatus that are similar to those shown in FIG. 1 are designated by the same reference numeral with the addition of a prime designation. The valve-command signals generated by the controller 32' of FIG. 6 pass along a first path to the data input terminal 80 of a switching device 82 having alternatively selectable data output terminals 84, 86. The valve command signals also pass to a gain device 88, which then converts them to damper command force signals. The damper command force signals of device 88 are received by a logic device 90, and a summer device 92. Summer 92 also receives, from a strain gauge or other suitable sensor 94 associated with damper 18, input signals that are proportional to the negative of the damping forces then being produced by the damper. Device 92 sums the aforesaid inputs to create an error signal which is representative of the control policy dictated change in the damping force. This error signal is transmitted to logic device 90. If the error signal is no greater than a preselected magnitude, in an absolute value sense, a command from logic device 90 causes the valve command signal at terminal 80 of switch 82 to be transmitted via switch terminal 84 directly to the combination valve actuator 28' of damper 18'. If the error signal received by it is greater than the preselected magnitude, device 90 causes the valve command signal output from switch 82 to device 28' to be via terminal 86 and a low pass filter 94, the break frequency and order of which are such as to "smooth" (i.e., reduce the rate of change of) the valve command signals sufficiently as to prevent the production by damper force discontinuities of objectionable magnitude. When the error signal transmitted by summer 92 to logic device 90 again becomes less than the preselected magnitude, device 90 returns switch 82 to the condition in which its output again is from terminal 84. As is indicated by phantom lines in FIG. 6, the filtered output signals of filter 96 may also be directed, via a gain device 98, to summer 92. Such signals could then be used, in lieu of those generated by sensor 94, to create the signal used by logic device 90 to cause the input of switch 82 to again be directed to terminal 84.

Results comparable to those described above and illustrated by the damping forces 56 of FIG. 3 may alternatively be achieved by providing a bypass flow path, of preselected size, that provides limited communication across valve 28 and thus between variable volume damper chambers 26, 26' even when valve 28 is fully closed. This is indicated by phantom lines in FIG. 1, wherein the numeral 30' designates a branch of the circuit 30 interconnecting damper chambers 26, 26'. Branch 30' contains a restriction 100, which may be of either a fixed or an adjustably variable type, and extends in parallel relationship to the main part of the circuit 30 containing valve 28. $C_{on}$ is the damping coefficient attributable to the restriction by valve 28, when damper 18 is in its "on" state, of fluid flow through the main part of fluid circuit 30. $C_{on}$ relates the damping face produced in the on-state of damper 18 to the absolute velocity of the supported member 12 (FIG. 1). $C_p$ is the damping coefficient attributable to restriction of fluid flow through parallel branch 30' of the circuit. If there is no flow through valve 28, $C_p$ relates the damping force to the relative velocity. $\Sigma_{on}$ is the on-state damping ratio (i.e., the ratio of $C_{on}$ to the critical damping) related to the on-state damping coefficient $C_{on}$ by the equation $\Sigma_{on} = C_{on} \div 2\sqrt{MK}$, wherein M is the mass of member 12 and K is the stiffness of spring 16. $\Sigma_p$ is the parallel flow path damping ratio (i.e., the ratio of $C_p$ to the critical damping) related to $C_p$ by the equation $\Sigma_p = C_{on} \div 2\sqrt{MK}$. FIG. 6 is a plot of the normalized "jerk" (i.e., the derivative of acceleration of a supported member, such as member 12) against the on-state damping ratio $\Sigma_{on}$ for mounting systems having a passive damper, a continuously variable semiactive damper not having a parallel flow path, and for a plurality of continuously variable semiactive dampers containing by-pass flow paths having different values of $\Sigma_p$.

Figure 7:
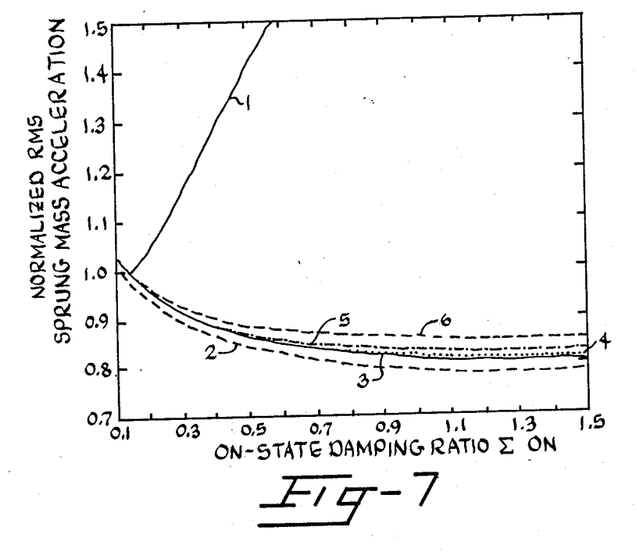
FIGS. 7 and 8 are graphic representations of the effects of varying a damping ratio of a semiactive damper.
Figure 8:
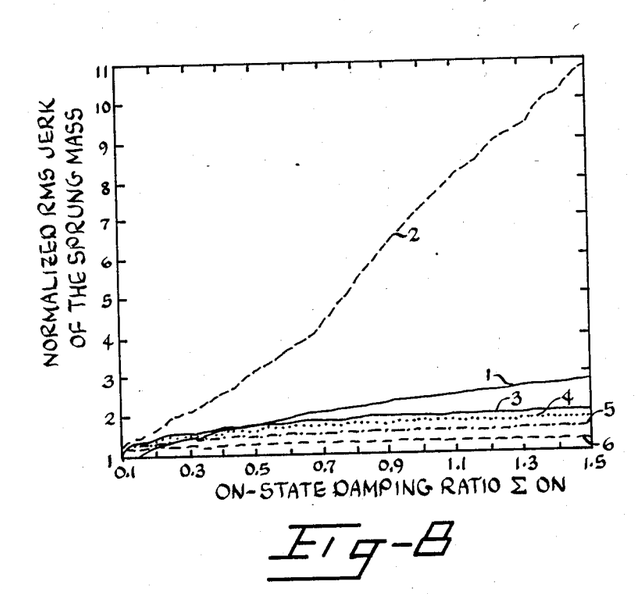

The curve 1 is for the passive damper. The curve 2 is illustrative of that produced by a conventional continuously variable semiactive damper having no parallel flow path and a very high value of $\Sigma_p$. Curves 3-6 represent semiactive damper systems in which $\Sigma_p$ has values of 1.0, 0.75, 0.5 and 0.25, respectively. As is apparent from a comparison of curve 2 and curves 3-6, each of the systems having parallel flow paths experiences less jerk than the conventional semiactive system, and the degree of jerk decreases as the value of $\Sigma_p$ decreases. However, as is apparent from the graph of FIG. 7, which is similar to that FIG. 6 except that the abscissa in this instance represents the acceleration of member 12, the effectiveness of the semiactive damper (in terms of the degree of "isolation" achieved) also decreases, particularly at the higher values of $\Sigma_{on}$, as the value of $\Sigma_p$ decreases. The preferred value of $\Sigma_p$ therefore is a compromise one, which yields significantly reduced jerk without unduly detracting from the isolation of member 12, within the range of about 0.5–1.0. It will be understood that in providing an $\Sigma$ value in the foregoing range, any leakage about or across value 28 should be taken into consideration since it also is in parallel with the valve and acts in the same manner as the flow through by-pass branch 30′ of circuit 30.

Figure 4:
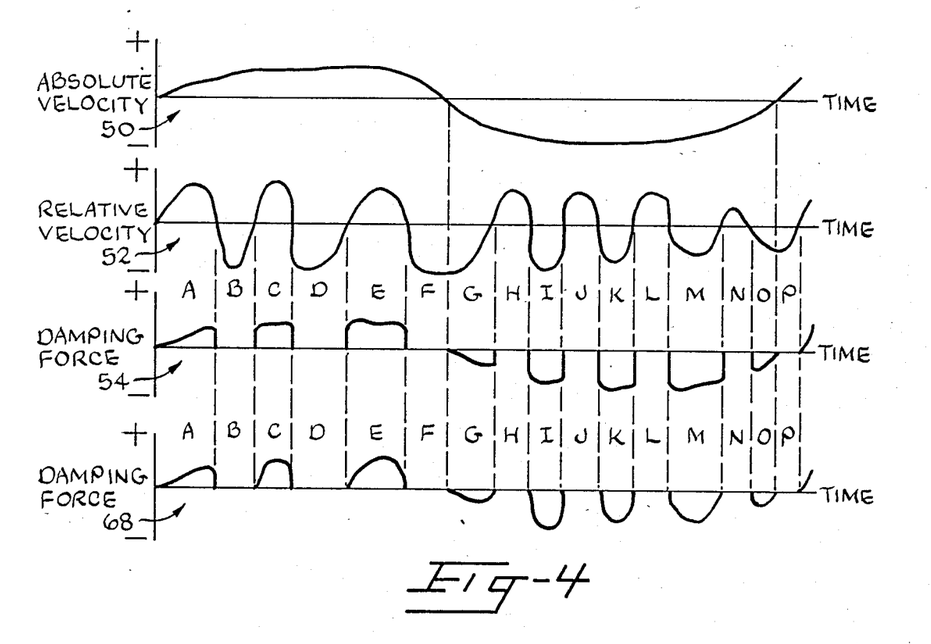
FIG. 4 is another simplified graphic comparison of the damper forces produced by the damper when operated in a conventional manner and in another modified manner.

In the graphic representation of FIG. 4, the absolute velocity 50, the relative velocity 52, and the damping force 54 are the same as those respectively designated by the corresponding numerals in FIG. 3. The other damping forces 68 shown in FIG. 4 are produced by another modified version of the damper control policy based upon the sign of the product of the absolute and relative velocities. In the FIG. 5 modified version of such policy, the damping coefficient of damper 18 (FIG. 1) is varied so as to cause the damping forces generated at those times when the sign of the aforesaid product is greater than zero, i.e., is plus or positive, to be the smaller of the damping forces proportional to the absolute velocity 50, or the damping forces proportional to the relative velocity 52. The result of this policy is most clearly apparent from the damping forces 68 in time interval E. Such forces track (i.e., are proportional to) the relative velocity 52 until such time as the relative velocity becomes greater than the absolute velocity 50. Forces 68 then track absolute velocity 50 until such time as relative velocity 52 again becomes smaller than absolute velocity 50.

Figure 5:
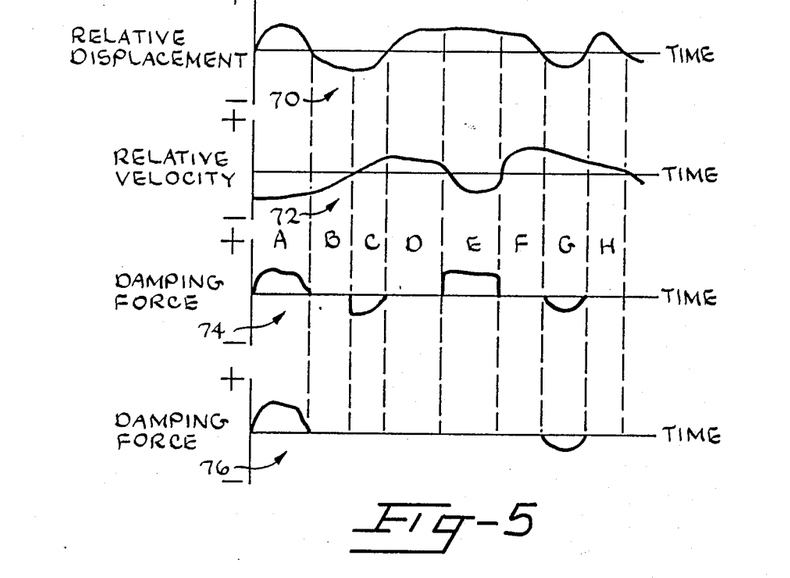
FIG. 5 is a simplified graphic comparison of the damping forces produced by the semiactive damper when operated in accordance with control policies based upon the product of the relative displacement and the relative velocity of the supported and supporting members.

FIG. 5 is a simplified graphic comparison of the damping forces produced in a force attenuating system, such as that of FIG. 1, controlled in accordance with standard and modified versions of the control policy predicated upon the sign of the product of the relative displacement 70 and relative velocity 72 of the supported and supporting members 12, 13. In accordance with the dictates of the standard control policy, damper 18 produces damping forces 74 proportional to the relative displacement 70 of members 12, 13 in those time intervals A, C, E and G when the product of the relative displacement and relative velocity 70, 72 is less than zero, i.e., is of negative sign. The other damping force 76 of FIG. 5 is that produced by utilization of a modified control policy in which all switching of the on/off states of damper 18 is deferred until relative displacement 70 is at or near zero. The modified policy produces damping forces only in time intervals A and G, and not in time intervals C and E. As in the case of the control policy predicated upon the product of the absolute velocity of the supported member times the relative velocity of the supported and supporting members 12, 13, another possible modification of the control policy predicated upon the product of the relative displacement and the relative velocity of the supported and supporting members 12, 13 would be to cause the damping forces to be the smaller of those proportional to the relative displacement of members 12, 13, or those proportional to the relative velocity of members 12, 13.

In those modified control policies wherein state changes of damper 28 are deferred until the absolute velocity of supported member 12 is at or near zero, or until the relative displacement of supported and supporting members 12, 13 is at or near zero, the delay in state change does not necessarily have to occur at every such "zero crossing." Thus, by suitable programming of controller 32, the delays in state changes of damper 18 can be caused to occur only when the change is from a lower damping state to a higher damping state, or from a higher damping state to a lower damping state, etc. Modifications of the standard control policies frequently entail a compromise between system performance, on the one hand, and reduction of undesirable system shocks and noise, on the other hand. As a general rule, therefore, it is desirable to depart from the standard control policies only insofar as might be necessary to eliminate objectionable noise, jerks or shocks in the system.

It has been ascertained that the problem of noise generation in a conventional vehicle suspension system, such as that schematically shown in FIG. 1 and which includes a resilient deformable tire member 15 in series with the illustrated damper 18, is affected by the condition of the tire. Objectionable noise is particularly likely to ensue when damper 18 undergoes a change from a higher damping state to a lower damping state at a time when the magnitude of the tire's compressive deformation, and thus its stored energy, is of substantial magnitude. When in a high damping state, damper 18 transmits much of the load force of supported suspension member 12 to supporting member 13. This load force, as well as that of member 13, is transmitted via wheel 23 and axle 25 to tire 15, as a result of which the tire compressively deforms and stores energy. Abrupt reduction in the damping coefficient of damper 18, such as would occur upon change in the damper state from on to off, partially "decouples" supported suspension member 12 from suspension member 13. In a typical automobile suspension system the weight of member 12 is customarily many times greater than that of member 13. The foregoing "decoupling" therefore greatly reduces the forces tending to maintain tire 15 in a compressively deformed, energy-storing condition. Consequently, the tire undergoes rapid return movement to an undeformed condition and abruptly transmits a substantial portion of its stored energy, via wheel 23 and axle 25, to member 13. This causes "ringing" and "bouncing" of the aforesaid components and accompanying generation of objectionable "thumping" noise. If the particular system contains other resiliently deformable members in series with the damper, such as the compliant rubber bushings 24 shown in the system 10 of FIG. 1, these also may occasion or contribute to the production of objectionable shock forces and/or noise if the damper state is abruptly changed while such members are in a deformed energy-storing condition.

The aforesaid undesirable results can be eliminated, or at least minimized, by utilization of either of the modified versions of the control policies illustrated in FIGS. 2 and 5, and which defer damper state changes, or at least changes from an on state to an off state, until the absolute velocity (in the case of the FIG. 2 policy) or the relative displacement (in the case of the FIG. 2 policy) is zero or other preselected relatively low magnitude. An alternative approach is to defer all or at least some of the damper state changes until the magnitude of the deformation and thus the stored energy of tire 15, and/or of some other deformable energy-storing member within the system, is no greater than some preselected low magnitude. In the case of tire 15, this can be determined by monitoring the vertical displacement of member 13, either by use of data derived from that produced by accelerometer sensor 40, or by use of some other type of sensor (not shown) capable of more directly ascertaining the magnitude of the deformation and/or the stored energy of tire 15 and/or other energy-storing member of the system.

A further alternative is to defer some or all of the damper state changes until the stored energy of the deformable energy-storing system member is no greater than a preselected magnitude, or until the appropriate system motion parameter (e.g., absolute velocity or relative displacement) of the system is no greater than a preselected low magnitude, whichever first occurs.

While specific embodiments of the invention have been described, this was for purposes of illustration only, and not for purposes of limitation, the scope of the invention being in accordance with the following claims.

We claim:

1. In the method of operating a mounting system including relatively movable supported and supporting members interconnected by a continuously variable semiactive damper switched between an on state and an off state, and a third member capable of storing energy and of abruptly releasing its stored energy upon switching of the damper from one to the other of the states thereof, the third member being in series with the damper, the improvement comprising:

delaying switching of the damper from the one of its states to the other of its states until the energy stored by the third member is no greater than a preselected low magnitude.

2. A method as in claim 1, wherein the damper when in an on state generates damping forces proportional to the absolute velocity of the supported one of the members, and wherein switching of the damper from the one of its states to the other of its states is delayed until the energy stored by the third member is no greater than a preselected magnitude or until the absolute velocity of the supported member is no greater than a preselected magnitude, whichever first occurs.

3. A method as in claim 1, wherein the damper when in an on state generates damping forces proportional to the relative displacement between the supported and supporting members, and wherein switching of the damper from the one of its states to the other of its states is delayed until the energy stored by the third member is no greater than a preselected magnitude or until the relative displacement of the supported and supporting members is no greater than a preselected magnitude, whichever first occurs.

4. A method as in any of the preceding claims, wherein the one of the states is the on state of the damper.

5. The method of claim 1, wherein the preselected damping ratio is within the range of approximately 0.5 to 1.0.

6. The method of claim 5, wherein the mounting system includes supported and supporting members interconnected by the semiactive damper and by a spring member, and wherein the damping ratio of the second path is determined by the equation $\Sigma_p = C_p \div 2\sqrt{MK}$, wherein $C_p$ is the damping coefficient of the second path, M is the mass of the supported member, and K is the stiffness of the spring member.

7. In a method of operating a mounting system including relatively movable supported and supporting members interconnected by a continuously variable semiactive damper switchable between an on state and an off state, the damper when in an on state generating damping forces proportional to the absolute velocity of the supported one of the members, the improvement comprising:

delaying switching of the damper from the one of its states to the other of its states until the absolute velocity of the supported member is no greater than a preselected low magnitude.

8. A method of operating a mounting system including relatively movable supported and supporting members interconnected by a continuously variable semiactive damper, the damper being switchable between an on state and an off state wherein the damping coefficient of the damper is respectively relatively high and relatively low, comprising:

switching the damper from one of its states to the other of its states at times when first and second conditions are both met, the first condition being that the sign of the product of the relative displacement and the relative velocity of the members is negative, and the second condition being that the relative displacement of the members is no greater than a preselected magnitude.

9. A method as in claim 7 or 8, wherein the one of the damper states is the on state.

10. A method as in claim 8, wherein the damping forces generated by the damper in its on state are proportional to the relative displacement between the supported and supporting members.

11. In a method of operating a mounting system including relatively movable supported and supporting members interconnected by a continuously variable semiactive damper switchable between an on state and an off state, the improvement comprising:

causing the damping forces generated by the damper when in its on state to be the lesser of those proportional to the absolute velocity of the supported member or those proportional to the relative velocity of the supported and supporting members.

12. A method of operating a mounting system including relatively movable supported and supporting members interconnected by a semiactive damper switchable between an on state and an off state, comprising:

causing the damping forces generated by the damper when in its on state to be the lesser of those proportional to the relative displacement of the supported and supporting members or those proportional to the relative velocity of the supported and supporting members.

13. In a method of operating a mounting system including supported and supporting members interconnected by a continuously variable semiactive damper switchable between an on state wherein the damping coefficient of the damper changes between different relatively high values, and an off state wherein the damping coefficient of the damper is of preselected relatively low value, the improvement comprising:

limiting, to a preselected extent and at preselected times when the damper is in its on state, the rate of change of the damping coefficient of the damper.

14. The method of claim 13, wherein the damper is of a fluid type, and the system includes an adjustable valve for restricting to an adjustably variable degree fluid flow across the damper, and wherein the limiting of the rate of change of the damping coefficient includes limiting the rate of adjustment of the valve.

15. In a method of operating a mounting system including supported and supporting members interconnected by a semiactive damper, the damping force of which is changeable in accordance with the dictates of a preselected control policy, the improvement comprising:
   determining whether the magnitude of damping force changes dictated by the control policy is no greater than a preselected magnitude;
   effecting the policy-dictated force changes whose magnitude is no greater than the preselected magnitude;
   causing the magnitude of policy-dictated force changes that are greater than the preselected magnitude to be effected at a lesser magnitude no greater than the preselected magnitude.

16. The method of claim 15, wherein the lesser magnitude is the preselected magnitude.

17. The method of claim 15, wherein the step of determining the magnitude of damping force changes dictated by the control policy includes summing a first signal representative of the magnitude of a policy-dictated damping force, and a second signal representative of the negative of the actual damping force to obtain an error signal representative of the policy dictated change in the damping force.

18. In the method of operating a mounting system including a semiactive damper having variable volume chambers interconnected by a fluid circuit having a first flow path containing a rapidly adjustable valve, the method including adjusting the valve in accordance with the dictates of a preselected control policy to regulate the fluid flow through the first path of the circuit, the improvement comprising: permitting substantially simultaneously limited fluid flow between the damper chambers via a second flow path of the circuit, the second flow path being in parallel relationship with the first flow path and having a preselected damping ratio.

* * * * *